(12) United States Patent
Giacalone et al.

(10) Patent No.: US 9,932,101 B2
(45) Date of Patent: Apr. 3, 2018

(54) CEILING OF A VEHICLE, A VEHICLE, AND A METHOD OF USING SAID CEILING

(71) Applicant: AIRBUS HELICOPTERS, Marignane (FR)

(72) Inventors: Jean-Michel Giacalone, Aix en Provence (FR); Clement Peyrusaubes, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 324 days.

(21) Appl. No.: 14/852,957

(22) Filed: Sep. 14, 2015

(65) Prior Publication Data
US 2016/0075424 A1 Mar. 17, 2016

(30) Foreign Application Priority Data
Sep. 16, 2014 (FR) ..................................... 14 02075

(51) Int. Cl.
  *B64C 1/00* (2006.01)
  *B64C 1/06* (2006.01)
  *B61D 1/00* (2006.01)
  *B64D 11/00* (2006.01)

(52) U.S. Cl.
  CPC ................ *B64C 1/066* (2013.01); *B61D 1/00* (2013.01); *B64D 11/00* (2013.01)

(58) Field of Classification Search
  CPC ......... B64C 1/00; B64C 1/066; B64C 1/1438; B64D 11/00; B64D 2011/0046
  USPC ...................................... 244/119; 296/216.01
  See application file for complete search history.

(56) References Cited

U.S. PATENT DOCUMENTS

| 4,050,208 A | 9/1977 | Pompei et al. |
| 4,375,876 A | 3/1983 | Stewart |
| 2001/0030452 A1* | 10/2001 | Karami .................... B60J 7/047 296/216.01 |
| 2002/0003359 A1* | 1/2002 | De Gaillard ........... B60J 1/1823 296/216.01 |

(Continued)

FOREIGN PATENT DOCUMENTS

| EP | 1449764 | 8/2004 |
| GB | 730969 | 5/1955 |
| WO | 2007042276 | 4/2007 |

OTHER PUBLICATIONS

French Search Report for French Application No. FR 1402075, Completed by the French Patent Office dated May 7, 2015, 6 Pages.

*Primary Examiner* — Tien Q Dinh
*Assistant Examiner* — Aaron M Rodziwicz
(74) *Attorney, Agent, or Firm* — Brooks Kushman P.C.

(57) ABSTRACT

A ceiling provided with a plurality of rigid panels. Presser means tending to press each panel longitudinally against at least one adjacent panel. At least one panel is a "sliding panel" carried by a guide device so as to slide in a sliding plane. One panel is a "retractable panel" movable from an open position towards a closed position, the sliding panels being free to move in longitudinal translation along the guide device when the retractable panel is in the open position and being locked while being arranged longitudinally one after another when the retractable panel is in the closed position. The ceiling comprises movement means for moving the retractable panel in reversible manner from the closed position to the open position.

21 Claims, 7 Drawing Sheets

(56) References Cited

U.S. PATENT DOCUMENTS

| | | | |
|---|---|---|---|
| 2003/0214157 A1* | 11/2003 | De Gaillard | B60J 7/043 296/216.01 |
| 2004/0070234 A1* | 4/2004 | Boss | B60J 7/047 296/216.01 |
| 2005/0116511 A1* | 6/2005 | Leroy | B60J 7/02 296/216.01 |
| 2011/0024058 A1 | 2/2011 | Kernmayer et al. | |
| 2011/0163573 A1* | 7/2011 | Gatta | B60J 7/06 296/216.01 |
| 2012/0175071 A1 | 7/2012 | Wuggetzer et al. | |

* cited by examiner

CEILING OF A VEHICLE, A VEHICLE, AND A METHOD OF USING SAID CEILING

CROSS REFERENCE TO RELATED APPLICATION

This application claims priority to French patent application No. FR 14 02075 filed on Sep. 16, 2014, the disclosure of which is incorporated in its entirety by reference herein.

BACKGROUND OF THE INVENTION (1) Field of the Invention

The present invention relates to a ceiling of a vehicle, as well as to a vehicle provided with such a ceiling and to a method of using the ceiling. In particular, such a vehicle is an aircraft.

The invention thus lies in the technical field of trim panels for the ceiling of a vehicle.

(2) Description of Related Art

An aircraft usually includes panels covering the walls of a vehicle cabin. Under such circumstances, such panels are commonly referred to as "trim panels".

A ceiling may in particular comprise a plurality of trim panels defining a cabin in elevation.

Those trim panels conceal members of the aircraft, such as hydraulic lines, electric cables, lighting devices, air-conditioning systems, etc.

Those members may require the intervention of maintenance teams. An individual may need to access a member in order to check its operation periodically or in order to replace a defective part, for example.

In order to access the elements located behind a trim panel of a ceiling, an operator must therefore remove the panel concerned. The removal of one trim panel sometimes requires the removal of adjacent trim panels.

Each removal of a trim panel may thus involve manipulations that are likely to weaken or deteriorate at least one trim panel.

In that context, document EP 1 449 764 describes a panel fitted with an outboard membrane and an inboard membrane defining a cavity. An insulating material is then arranged in that cavity.

Each panel is fastened while being wedged between a fastener rail and an elongate fastener element.

Certain aircraft are thus sometimes provided with access hatches making it possible to perform maintenance actions.

The addition of an access hatch leads to an increase in the weight of the aircraft. Moreover, the access hatch may give rise to problems of soundproofing. Finally, an access plate proves to be not very attractive visually.

Document US 2012/175071 describes a stretched fabric extending longitudinally between two ends in order to create a ceiling. Tighteners are fastened to the ends in order to tighten the fabric. In addition, longitudinal edges of the fabric extend in guides. Furthermore, transverse arched stiffeners stiffen the fabric locally.

Document US 2012/175071 therefore does not provide teaching relating to accessing elements located behind a ceiling.

Document GB 730 969 describes an airplane provided with a hold.

That hold may be divided vertically into two storage spaces.

Thus, the hold includes stationary rails arranged at mid-height, and an elevator provided with rails movable in elevation. Each movable rail may thus be moved vertically from the bottom of the hold along a stationary rail.

If the hold needs to be divided in order to optimize its space, plates are placed individually in the elevator in order to be inserted between the stationary rails. Each plate is then fastened to the stationary rails by blocking means in order to form a floor.

Document GB 730 969 thus relates to a floor. That document GB 730 969 therefore does not provide teaching relating to accessing elements located behind a ceiling.

Document GB 730 969 is thus far removed from the invention, and is mentioned only as part of the technological background.

Document WO 2007/042276 describes a passageway ceiling that is movable vertically in order to be raised when the passageway is not in use.

Document WO 2007/042276 therefore does not provide teaching relating to accessing elements located behind a ceiling.

Document WO 2007/042276 is thus far removed from the invention, and is mentioned as part of the technological background only.

Document US 2011/0024058 presents a ceiling provided with two panels.

Document U.S. Pat. No. 4,050,208 describes a ceiling provided with a panel assembly.

Document U.S. Pat. No. 4,375,876 does not belong to the field of the invention since it relates to a foldable door.

BRIEF SUMMARY OF THE INVENTION

The present invention thus relates to a ceiling fitted with trim panels aiming to facilitate access to elements located behind the trim panels.

According to the invention, a ceiling of a vehicle is provided with a plurality of rigid panels, each rigid panel extending longitudinally from a longitudinal edge referred to as a "front edge" towards a longitudinal edge referred to as a "rear edge" and laterally from a left edge towards a right edge.

In addition, the ceiling comprises presser means tending to press each ceiling panel longitudinally against at least one adjacent panel.

Furthermore, the panels comprise at least one panel referred to as a "sliding panel" carried by a guide device, the left edge and the right edge of each sliding panel being permanently located in the same plane referred to as the "sliding plane", each sliding panel being capable of sliding longitudinally along said guide device.

The panels further comprise at least one panel referred to as a "retractable panel" that is movable in elevation in order to be moved in reversible manner from a position referred to as an "open position" towards a position referred to as a "closed position", the left edge and the right edge of the retractable panel being located in the sliding plane in the closed position and below the sliding plane in the open position, a longitudinal edge of the retractable panel touching a longitudinal edge of a sliding panel in the closed position, said sliding panels being free to move in longitudinal translation along said guide device when at least one retractable panel is in the open position and being locked while being arranged longitudinally one after the other when each retractable panel is in the closed position.

The ceiling thus comprises movement means for moving the retractable panel in reversible manner from the closed position to the open position.

Consequently, the ceiling is not provided with a stretched fabric or with a single panel.

Indeed, this ceiling is divided longitudinally into a plurality of panels placed end-to-end one after another along a longitudinal direction.

These panels comprise movable panels that can be moved in translation horizontally in the sliding plane along a guide device. Such a panel is described as "movable" because of its ability to be moved in the sliding plane.

In addition, at least one of the panels is a retractable panel. By way of example, said retractable panel may undergo at least one movement in rotation in order to be refracted into an open position in such a manner as to release space in the sliding plane. This panel is described as "retractable" because of its ability to be moved vertically from a closed position to an open position so as to release a space in the sliding plane. For example, only one panel is a retractable panel.

When each retractable panel is in the closed position, the movable panels and the retractable panels are pressed against one another by the presser means. Such presser means may comprise at least one resilient member, e.g. a member comprising a block of resilient matter such as an elastomer material or at least one spring, for example.

In an embodiment provided with a single retractable panel, the movable panels are for example placed between the presser means and the retractable panel.

In an embodiment provided with two retractable panels, the movable panels are for example placed between the retractable panels, the presser means comprising a resilient member placed between two movable panels.

When a retractable panel is in the open position, said retractable panel is arranged under the sliding plane. The absence of the retractable panel in the sliding plane has the effect of releasing a space in said sliding plane.

This empty space then potentially makes it possible for an operator to have access to elements located behind the retractable panel.

In addition, this empty space makes it possible to cause the other panels, referred to as "movable panels" to slide in the sliding plane. By moving the movable panels, an operator can then access elements located behind said movable panels.

Consequently, the invention makes it possible to access elements concealed by the ceiling without removing panels, but by using the ability of the retractable panel to move in elevation in such a manner as to take advantage of an ability of the movable panels to move in translation. The risks of damaging a panel during this operation are thus reduced.

The invention further makes it possible to avoid fitting access hatches.

In addition, the ceiling is not made using a stretched fabric but by means of rigid panels. Consequently, the rigidity of the panels associated with the compression exerted by the presser means tends to optimize sealing of the ceiling.

This ceiling may also include one or more of the following characteristics.

Thus, at least one panel may have a longitudinal edge provided with at least one male peg tending to penetrate into a female opening of a longitudinal edge of another panel as a result of a pressure exerted by the presser means.

The pegs make it possible to position the panels correctly against one another when the ceiling is closed.

This characteristic tends to optimize the soundproofing between panels. The interface between the panels may indeed be simplified.

In addition, by means of the pegs and the presser means, sealing between panels is ensured regardless of structural deformations, at least except for a crash.

In addition, the presser means are possibly placed against a longitudinal edge of a first sliding panel, the first sliding panel touching a single other panel by the other longitudinal edge of said first sliding panel, said presser means having fastener means suitable for fastening to a frame of a vehicle.

Furthermore, by way of example, the movable panels between the presser means and the retractable panel touch one another in pairs.

Furthermore, each panel may be in the shape of an arch.

The panels are thus arcuate in order to form self-supporting arches. Each arch is supported on both sides of the cabin by the guide device.

Such a guide device may comprise two longitudinal guide rails arranged in the sliding plane, each guide rail having at least one fastener device for fastening to at least two frames of a vehicle.

Each rail may comprise a plurality of segments arranged in pairs and placed end-to-end.

Consequently, the forces exerted on the ceiling are taken up by the rails. Each rail may thus present a channel section having a concave side directed towards the panels.

This architecture facilitates dimensioning of the ceiling.

In addition, using panels in the form of arches reduces vibratory bridges between the structure carrying the ceiling and the panels by limiting the fastening points necessary to support the panels.

Furthermore, each sliding panel may be secured to a support carrying at least one electrical connector engaged in another electrical connector and/or including a hollow duct in alignment with another hollow duct.

The sliding of each panel sliding in the same sliding plane makes it possible to use automatic connections, both for electric circuits and air-flow circuits.

By way of example, a support comprises a box fitted under each sliding panel, which box incorporates multiple systems, such as reading lights, loudspeakers, air outlets.

The electrical connectors enable automatic electrical connection between two adjacent panels. To this end, each sliding panel has at least one male connector in line with a female connector in order to promote engagement of the movable panels in pairs.

Consequently, this architecture does not require a step of making electrical connections between the movable panels.

In addition, this system enables air-conditioning ducts to connect automatically between the movable panels.

In a first embodiment, for at least one retractable panel, the movement device comprises at least one hinge fastened to a longitudinal edge of said retractable panel in order to enable the retractable panel to move in rotation from the open position towards the closed position, and a locking device in order to lock the retractable panel is in the closed position.

By way of example, each hinge has an axis of rotation about which the retractable panel can turn, this axis of rotation being substantially parallel to the sliding plane and being located under said sliding plane.

The retractable panel is mounted on at least one pivot in order to be able to tilt and release space in the transverse plane.

By way of example, a longitudinal edge is provided with two pivots in order to position the retractable panel substantially in a vertical plane orthogonal to the sliding plane in the open position.

By way of example, the retractable panel touches sliding panel by its rear edge and a frame of the vehicle along its front edge.

Under such circumstances, in a variant, the hinges are interposed between said frame and the front edge. The retractable panel thus rocks vertically against the partition in the open position.

This movement in rotation releases space in order to perform a maintenance action above the retractable panel or in order to move at least one sliding panel.

In another variant, the hinges are interposed between the rear edge and the sliding panel closest thereto. The retractable panel can then slide together with said sliding panel when in the open position.

In a second embodiment, for at least one retractable panel, the movement device comprises a system for shifting the retractable panel vertically, the retractable panel in the open position being parallel to an image of the retractable panel arranged in the closed position.

Consequently, the vertical shift system makes it possible to move the retractable panel in translation vertically along a vertical direction that is substantially perpendicular to the sliding plane. This vertical movement in translation is obtained by means of two successive rotations.

For a retractable panel having a longitudinal edge referred to as a "touching edge" that touches a sliding panel in the closed position and a longitudinal edge referred to as a "non-touching edge" that never touches a sliding panel, the movement device may comprise at least one slideway referred to as a "stationary slideway" extending at least under the retractable panel in the closed position, with a pivot member secured to said non-touching edge sliding along the stationary slideway.

By way of example, the movement device comprises two stationary slideways along which two pivot members slide.

Relative to the cabin, the stationary slideways of the retractable panel are placed opposite from and facing the presser means, for example. These stationary slideways are vertical slides fastened to a wall of the cabin.

In the closed position, the pivot member is placed in an upper section of the stationary slideways. In contrast, the pivot member is placed in a lower section of the stationary slideways when the retractable panel is in the open position.

Such a pivot member may comprise a pivot shaft secured to a shoe sliding along a U-shaped or T-shaped stationary slideway.

Furthermore, each pivot member is advantageously arranged under the retractable panel while being secured to a projection in elevation of said non-touching edge of the retractable panel.

Furthermore, the movement device may include a locking member for locking said pivot member relative to the corresponding stationary slideway in the closed position.

The locking member tends to hold the retractable panel in the closed position without requiring a voluntary action from an individual.

Such a locking member may comprise a peg or a ball-bearing system for example.

In addition, each stationary slideway may extend from an upper section towards a lower section, and the lower section may include an abutment referred to as a "low abutment", in order to limit the downwards movement in translation of each pivot member.

Furthermore, each pivot member may be fastened in removable manner to the retractable panel. This characteristic makes it possible for an operator to remove the retractable panel if necessary.

In addition, for at least one retractable panel including a longitudinal edge referred to as a "touching edge" that touches a sliding panel in the closed position and a longitudinal edge referred to as a "non-touching edge" that does not touch a sliding panel, and said movement device comprises at least one slideway referred to as a "movable slideway" secured to said touching edge and a rod, said rod including a bottom end provided with pivot means sliding along the movable slideway and a top end provided with a hinged assembly ready to be fastened to a frame of a vehicle.

The movement device may also include a locking system for locking each movable slideway relative to the pivot means in the closed position.

Furthermore, each pivot means may be fastened in removable manner to the corresponding rod.

In addition, for each movable slideway extending from an upper segment towards a lower segment, the upper segment may comprise an abutment referred to as a "high abutment".

In order to open the ceiling, an operator releases the pivot members by operating the locking members.

Pulling on the retractable panel generates a movement in translation of the panel by moving each pivot member along a stationary slideway. This pivoting is allowed by the rods.

When the low abutments are reached, the panel pivots in another direction of the pivot members. The movable slideways then move relative to the rods, this movement finally being stopped by the high abutments.

The retractable panel is then arranged under the sliding plane while being substantially parallel to its initial position.

Furthermore, the procedure described above is reversible so as to allow the ceiling to be closed by putting the retractable panel in its closed position.

Putting the retractable panel into the closed position enables a force to be applied that is sufficient to compress the presser means and to engage in the required manner all the centering pegs together with the various electric and air-flow connections.

Thus, the invention does not require seats to be removed in order to open a ceiling. This aspect is particularly appropriate for a rotorcraft that might be provided with a low ceiling.

In addition to a ceiling, the invention provides a vehicle including a cabin.

This cabin is then provided with a ceiling of the above-described type.

The invention also provides a method of accessing elements located behind such a ceiling, during which:
at least one retractable panel is moved in elevation from the closed position to the open position;
at least one sliding panel is moved longitudinally in order to access said elements;
said sliding panels are put back in place; and
each retractable panel is moved from the open position to the closed position in order to close the ceiling, said presser means being compressed.

BRIEF DESCRIPTION OF SEVERAL VIEWS OF THE DRAWINGS

The invention and its advantages appear in greater detail in the context of the following description of examples given by way of illustration and with reference to the accompanying figures, in which.

Elements that are present in more than one of the figures are given the same references in each of them.

DETAILED DESCRIPTION OF THE INVENTION

It should be observed that three mutually orthogonal axes X, Y, and Z are shown in certain figures. The first direction X is said to be longitudinal. The term "longitudinal" relates to any direction parallel to the first axis X.

The second axis Y is said to be the "transverse" axis. The term "transverse" relates to any direction parallel to the second axis Y.

Finally, the third axis Z is said to be the "elevation" axis. The expression "elevation" relates to any direction parallel to third axis Z.

Figure 1:
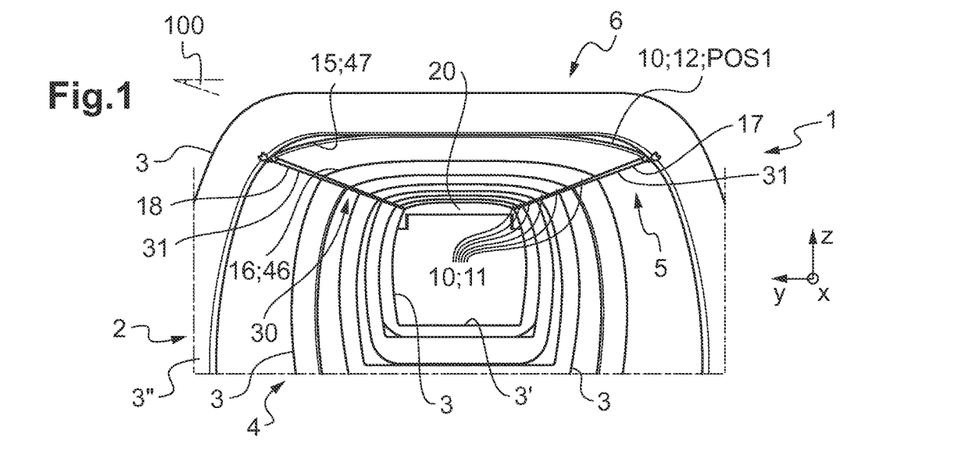
FIG. 1 is a front view of a ceiling of the invention.

FIG. 1 presents a vehicle 1 including a cabin 4. By way of example, this vehicle may be an aircraft, such as a rotorcraft in particular.

The cabin 4 is defined by a plurality of frames 3. Each frame 3 extends in a transverse plane, i.e. a plane extending parallel to the direction in elevation Z and to the transverse direction Y.

The cabin 4 may also be defined by a ceiling 5 concealing elements 6 of the vehicle. The ceiling 5 is then suspended from the frames 3.

The ceiling 5 comprises a plurality of rigid panels 10 arranged one behind another along a longitudinal direction. Each panel may be substantially in the shape of an arcuate quadrilateral. Each panel may thus be in the shape of an arch.

Furthermore, each panel extends longitudinally from a longitudinal edge referred to as a "front edge" 15 towards a longitudinal edge referred to as a "rear edge" 6 along a direction going from the front to the rear of the vehicle. In addition, each panel extends laterally from a side edge referred to as a "left edge" 17 towards a side edge referred to as a "right edge" 18.

Thus, in a direction going from the front to the rear of the vehicle, the front edge of a panel touches the rear edge of another adjacent panel, except for the panel located closest to the front of the cabin.

The ceiling comprises two types of panel 10.

Specifically, the ceiling is fitted with at least one panel referred to as a "sliding panel" 11. In the example in FIG. 1, the ceiling is provided with six sliding panels.

Each sliding panel is carried by a guide device 30. This guide device may include two guide rails 31 defining a sliding plane 100 for movement in translation. Each guide rail then has at least one fastener device 33 to be carried by at least one frame, and advantageously by two frames 3.

Consequently, the left edge 17 and the right edge 18 of each sliding panel 11 are always engaged with a guide rail and thus permanently located in the sliding plane 100.

Figure 2:
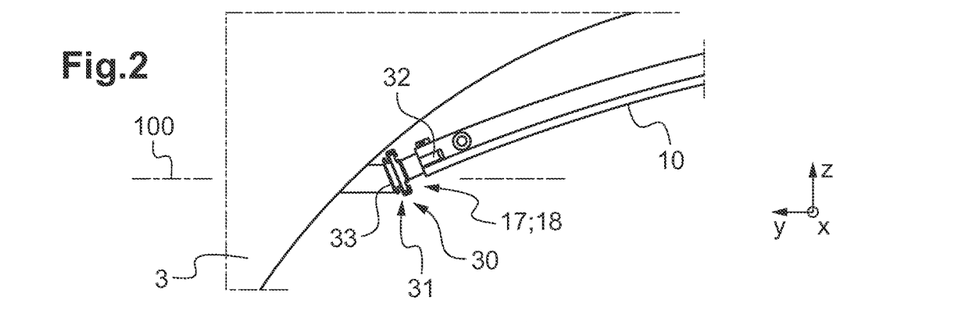
FIG. 2 is a section view showing fastening of a panel to a guide rail.

With reference to FIG. 2, each side edge 17, 18 may include a mechanical decoupling system 32 between the sliding panel 11 and the guide device 30. Thus, the mechanical decoupling system 32 slides along a guide rail 31. By way of example, each guide rail is C-shaped or T-shaped, the mechanical decoupling system 32 having a complementary shape so as to slide along said guide rail.

Consequently, each sliding panel 11 can slide longitudinally along the guide device 30.

Figure 3:
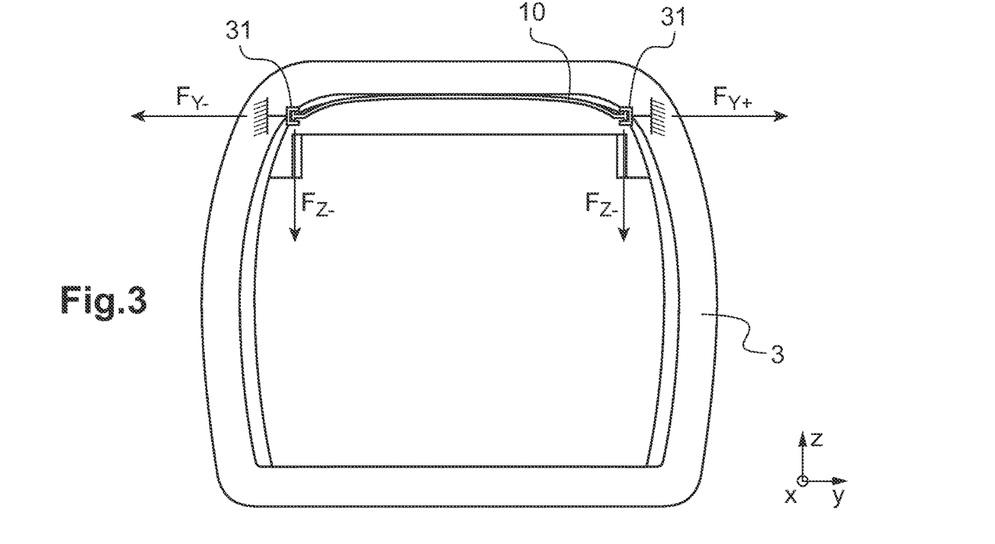
FIGS. 3 and 4 are diagrams showing the distribution of forces on a panel.
Figure 4:
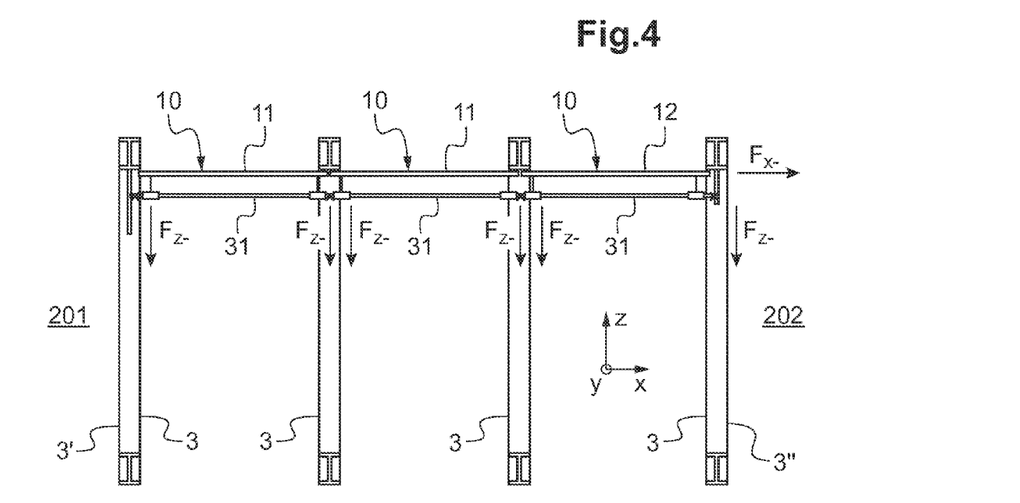

With reference to FIGS. 3 and 4, each panel represents a self-supporting arch carried by two guide rails.

The forces in elevation $F_{Z-}$ exerted on each panel are thus taken up by the guide rails transversely on either side of the panel, and then transmitted to the frames 3.

With reference to FIG. 3, the transverse forces $F_{Y-}$ and $F_{Y+}$ exerted on each panel are then taken up by the guide rails transversely on either side of the panel, and then transmitted to the frames 3. Each transverse force is directed along a direction going from the panel towards a guide rail.

With reference to FIG. 4, each panel presses on the panel located in front of it or behind it along a direction going from the rear 201 towards the front 202 of the cabin. The longitudinal forces are thus transmitted to the first frame 3' and to the last frame 3".

In addition and with reference to FIG. 1, the ceiling 5 may comprise at least one panel referred to as a "retractable panel" 12. FIG. 1 presents a variant provided with a single retractable panel 12.

This retractable panel 12 is movable in elevation in order to be moved in reversible manner from a position referred to as an "open position" POS2 towards a position referred to as a "closed position" POS1 visible in FIG. 1.

In this closed position POS1, the left edge 17 and the right edge 18 of the retractable panel 12 are located in the sliding plane 100, and thus in continuity with the side edges of the sliding panels.

In contrast, as explained below, the left edge 17 and the right edge 18 of the retractable panel 12 are located under the sliding plane 100 when in the open position POS2.

The movable panels are located behind one another longitudinally. Consequently, the retractable panel is located after the sliding panels, or before the sliding panels. Under such circumstances, the retractable panel comprises a longitudinal edge referred to as a "touching edge" 46 that is to touch a sliding panel in the closed position POS1. In addition, the retractable panel has a longitudinal edge referred to as the "non-touching edge" 47 that never touches a sliding panel 11, but that is placed against a frame 3" of the cabin. Specifically, the rear edge of the retractable panel presented represents its touching edge, and the front edge of the retractable panel represents its non-touching edge arranged against the last frame 3" of the cabin.

In addition, the ceiling comprises presser means 20 tending to press each panel longitudinally against at least one adjacent panel, in particular in the closed position.

By way of example, the presser means 20 are resilient means touching a frame 3 and the first sliding panel 11, i.e. the only sliding panel that touches only one other panel in the variant of FIG. 1. Consequently, all the sliding panels 11 are arranged between the presser means 20 and the retractable panel in this realization.

Figure 5:
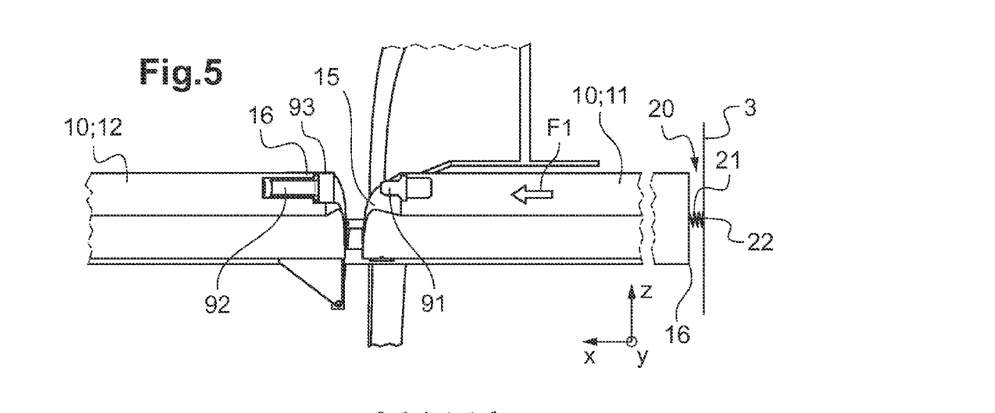
FIGS. 5 and 6 are diagrams presenting a centering peg.

With reference to FIG. 5, the presser means 20 are thus provided with conventional fastener means 22 in order to attach it to a frame. By way of example, the presser means comprise a spring provided with an end that is fastened to a frame 3.

In addition, the presser means 20 are fastened to the rear edge 16 of the first sliding panel.

The presser means then tend to move the first sliding panel along the arrow F1 so as to press it against an adjacent panel.

In order to optimize touching of two panels against each other, at least one panel 10 includes a longitudinal edge provided on its edge face with at least one male peg 91.

Figure 6:
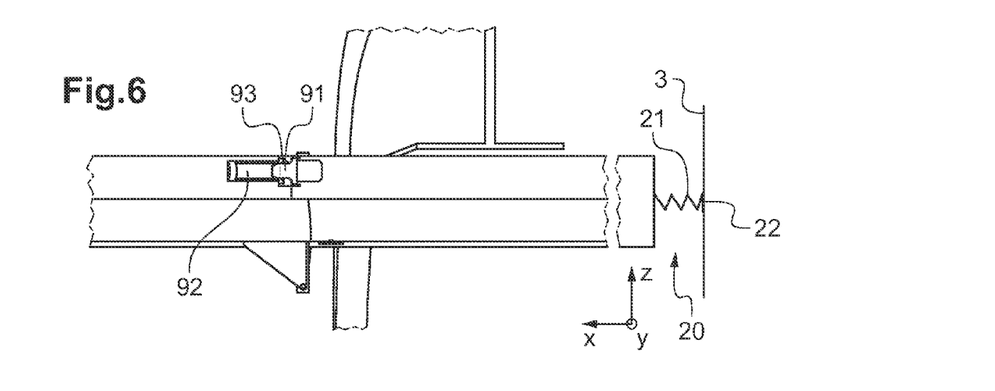

With reference to FIG. 6, this male peg is dimensioned to penetrate into a female opening 92 in a longitudinal edge face of an edge of another panel, in particular following pressure exerted by the presser means 20.

Foam 93 may be arranged around each female opening 92 to ensure soundproofing.

Each panel may then include at least one male peg and/or at least one female opening so as to constitute a unified surface in the closed position POS1.

Figure 7:
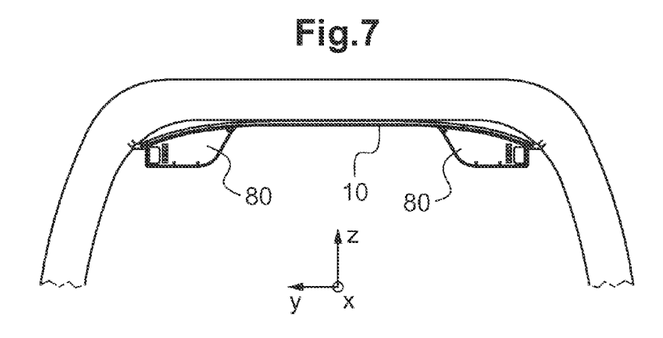
FIGS. 7 and 8 are diagrams relating to panel supports.

In addition, at least one panel may be secured to at least one support 80.

By way of example, said support 80 comprises a box fastened to the panel, while extending along the entire length of the panel.

Figure 8:
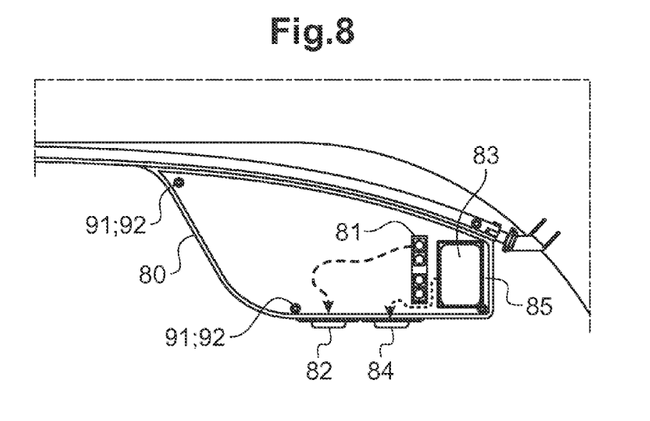

With reference to FIG. 8, this box may carry reading lights 82, loudspeakers (not shown), or air outlets 84.

Thus, the support shown in the diagram comprises at least one electrical connector 81 engaged in the closed position POS1 in an electrical connector 81 of an adjacent panel or an adjacent frame, for example. This electrical connector 81 is then connected to the electrical equipment of the box and/or to another electrical connector 81 of the box.

The support shown in the diagram further includes a hollow duct 83 in alignment with a hollow duct 83 of another panel, for example. In particular, this hollow duct may enable air to flow to the air outlets 84.

Protective or sealing foam 85 may surround the hollow duct to protect the members extending along said hollow duct, if necessary.

Figure 9:
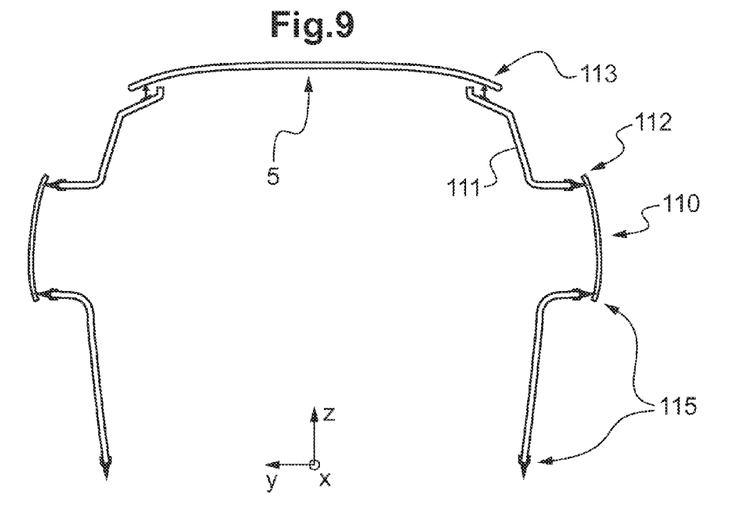
FIG. 9 is a diagram presenting interface means between the ceiling and trim walls.

FIG. 9 presents an interface between the ceiling 5 and possible side walls.

A side trim wall may thus comprise a flank 111. This flank 111 may touch at least one window 110 and a floor via lip seals 112, 115.

Furthermore, a wiper seal 113 may be placed between each flank and a sliding panel in order to allow the sliding panels to move in translation.

With reference to FIG. 1, the ceiling further comprises movement means for moving the retractable panel 12 in reversible manner from the closed position POS1 to the open position POS2.

Figure 10:
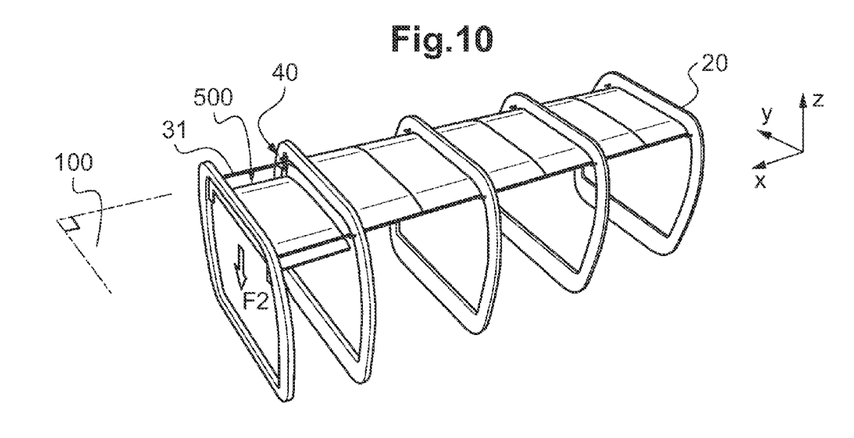
FIGS. 10 to 12 are diagrams explaining the operation of the ceiling.

With reference to FIG. 10, an operator thus operates the movement device 40 to move the retractable panel along arrow F2 from the closed position POS1 to the open position POS2.

By way of example, the retractable panel is then parallel to its initial position while being located under the sliding plane, nevertheless, the retractable panel remains suspended.

This movement then releases a space 500 in the sliding plane. This empty space thus allows the sliding panels to move in translation.

Figure 11:
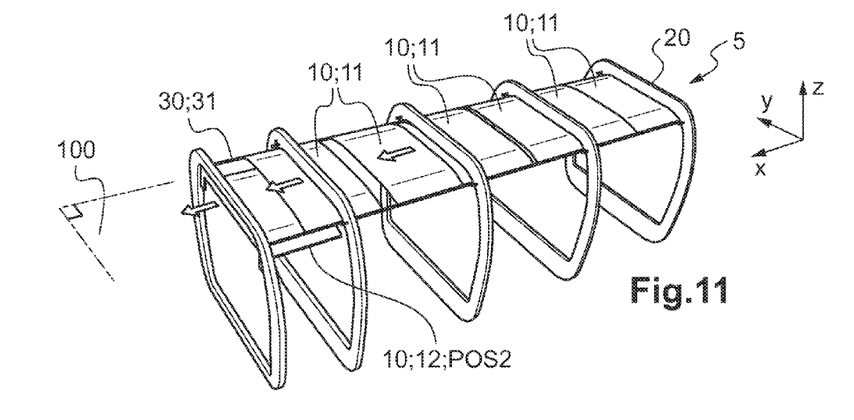
Figure 12:
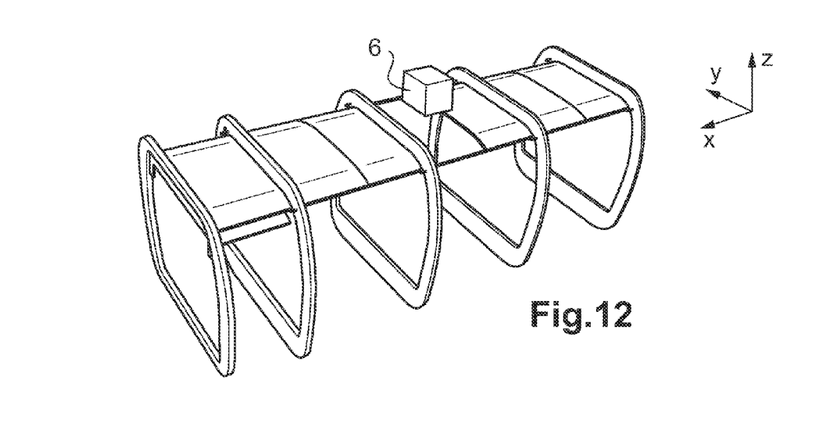

With reference to FIGS. 11 and 12, an operator moves at least one sliding panel 11 longitudinally in order to access elements 6 that were initially concealed by the ceiling.

At the end of this operation, the operator puts the sliding panels 11 back in their initial positions by compressing the presser means 20.

Finally, the operator moves the retractable panel 12 from the open position POS2 to the closed position POS1 in order to close the ceiling 5.

Figure 13:
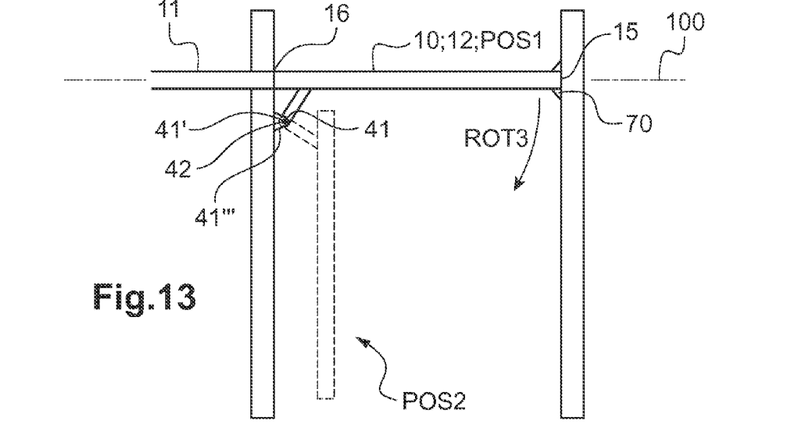
FIG. 13 is a diagram presenting a first embodiment.

In the first embodiment shown in FIG. 13, the movement device comprises at least one hinge 41 connected to a longitudinal edge of the retractable panel. This hinge may comprise a pivot shaft 41' passing through a projection from the panel and a fitting 41'''. The pivot shaft 41' then extends along an axis of rotation 42 about which the retractable panel 12 can turn. This axis of rotation 42 may be substantially parallel to the sliding plane 100 and it is located under said sliding plane 100.

This hinge 41 enables rotation ROT3 of the retractable panel from its closed position PODS1 shown in continuous lines, to its open position POS2 shown in dotted lines.

The fitting can be connected to a frame. Nevertheless, the fitting can be connected to the sliding panel 11 adjacent to the retractable panel. Consequently, a movement in translation of the sliding panel 11 involves the retractable panel 12 also moving in translation.

Moreover, a conventional locking device 70 can lock the retractable panel 12 in the closed position POST in reversible manner.

For example, the locking device may comprise a removable stop.

FIGS. 14 to 19 show a second embodiment.

In this second embodiment, the movement device comprises a vertical shift system 45 for moving the retractable panel from the closed position to the open position.

Figure 14:
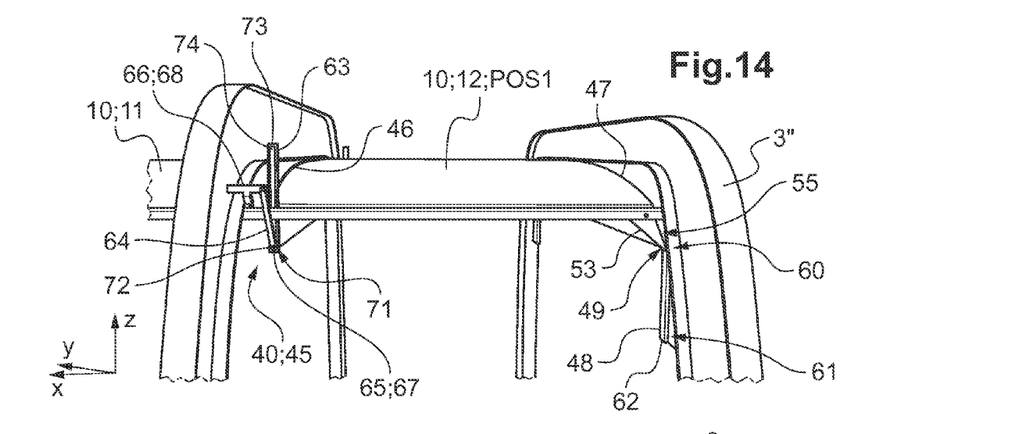
FIGS. 14 to 19 are diagrams presenting a second embodiment.
Figure 15:
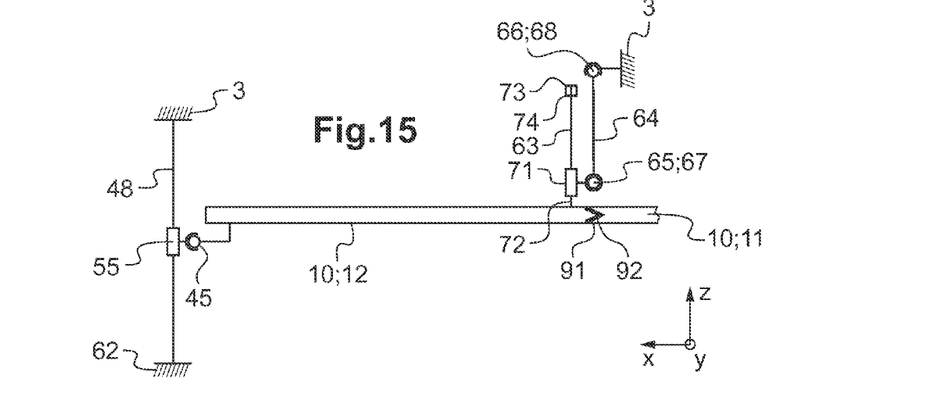

With reference to FIG. 14, this vertical shift system 45 comprises at least one stationary slideway 48. Advantageously, at least two stationary slideways are arranged.

Each stationary slideway extends substantially vertically under the retractable panel in its closed position POS1. By way of example, each stationary slideway is fastened to the last frame 3" of the cabin.

Consequently, the retractable panel is secured to a pivot member 49 via a stationary slideway. Fastening of a pivot member 49 to the retractable panel may be reversible in order to enable removal of the retractable panel.

By way of example, each pivot member 49 is secured to the non-touching edge 47 of the retractable panel. In addition, each pivot member 49 is located under the retractable panel while being fastened on a projection 53 in elevation secured to the retractable panel 12.

Thus, each pivot member slides along a stationary slideway and enables the retractable panel 12 to move in rotation relative to the stationary slideway.

Each stationary slideway 48 further extends from an upper section 60 towards a lower section 61. The lower section 61 may then include an abutment referred to as a "low abutment" 62 for limiting the freedom of downwards movement of the retractable panel.

In order to lock the retractable panel 12, the vertical shift system may comprise a locking member 55 for locking the pivot member 49 relative to the corresponding stationary slideway 48 in the closed position POS1.

Figure 20:
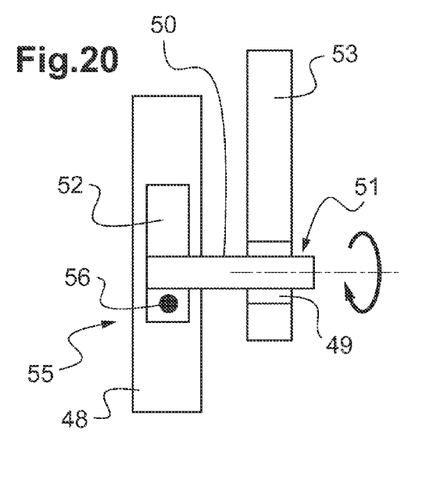
FIGS. 20 to 21 show embodiments of locking members.

In FIG. 20, the pivot member may include a pivot axis 50 hinged to the projection in elevation of the retractable panel. For example, a laminated or ball bearing hinge 51 is interposed between the axis 50 and the projection in elevation.

Furthermore, the pivot axis is secured to a shoe 52 sliding in or on a stationary slideway.

In the variant shown in FIG. 20, the locking member 55 comprises a removable latch 56 passing through the stationary slideway and the shoe 52.

Figure 21:
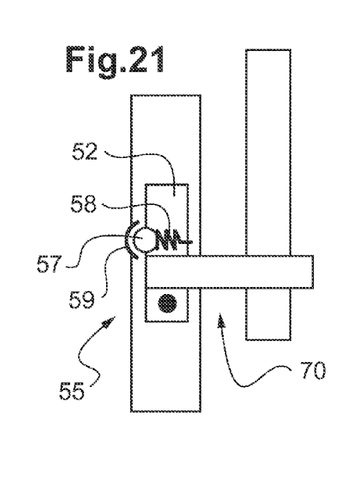

In the variant shown in FIG. 21, the locking member 55 comprises a ball 57 arranged in a cavity of the shoe. In addition, a spring 58 tends to push the ball 57 towards a cavity 59 of the stationary slideway. Without human intervention, the ball remains held in the cavity of the stationary slideway in order to lock the retractable panel.

These variants are described purely for illustration. Indeed, all conventional locking and pivot means can be envisaged.

With reference to FIG. 14, this vertical shift system 45 comprises at least one movable slideway 63. Advantageously, at least two movable slideways are provided.

Each movable slideway 63 is secured to the retractable panel.

In addition, the vertical shift system 45 includes one rod 64 per movable slideway 63. Each rod 64 thus extends from a bottom end 65 provided with pivot means 67 sliding along the movable slideway 63 and from a top end 66 provided with an assembly 68 hinged to a frame 3.

Consequently, each rod 64 can pivot relative to a frame. Furthermore, each movable slideway can slide and pivot relative to a rod.

Each pivot means can be fastened in removable manner to a rod in order to allow extraction of the retractable panel.

Furthermore, since each movable slideway 63 may extend from an upper segment 73 towards a lower section 72, said upper segment 73 may include an abutment referred to as a "high abutment" 74 in order to limit downwards movement of the retractable panel.

For example, each movable slideway 63 extends over a length equal to the length of the stationary slideways 48.

In addition, the vertical shift system may comprise a locking system 71 for locking each movable slideway 63 relative to the pivot means 67 in the closed position POS1. The technology described in FIGS. 20 and 21 is applicable to this locking system With reference to FIG. 15, the locking member 55 and the locking system 71 lock the retractable panel 12 in alignment with the sliding panels 11 in the closed position.

Figure 16:
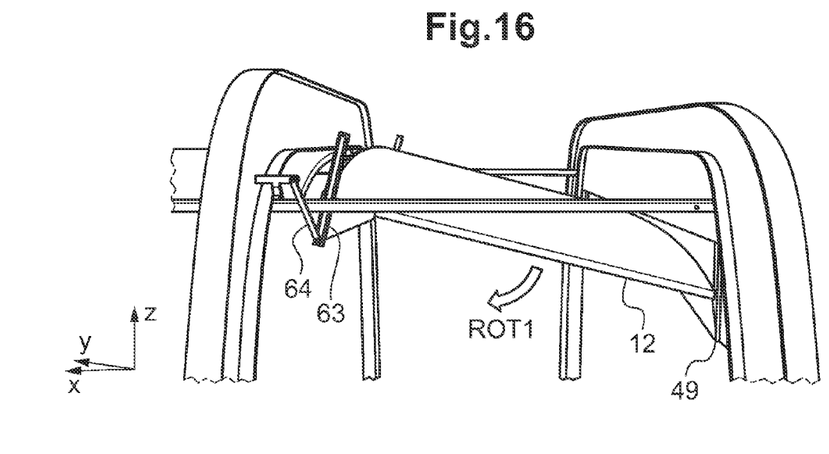
Figure 17:
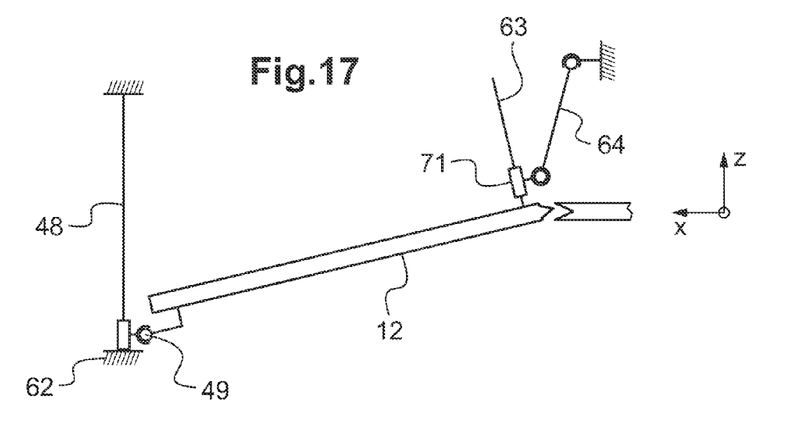

With reference to FIGS. 16 and 17, the operator thus inhibits the locking member 55.

Consequently, each pivot member 49 slides in the associated stationary slideway until it reaches a low abutment 62.

In addition, each rod 64 slopes relative to the associated frame. Each movable slideway then pivots relative to the associated rod 64.

Under such circumstances, the retractable panel performs a first movement in rotation ROT1 and moves away from the adjacent sliding panel. This movement makes it possible to separate the retractable panel 12 from said sliding panel.

Figure 18:
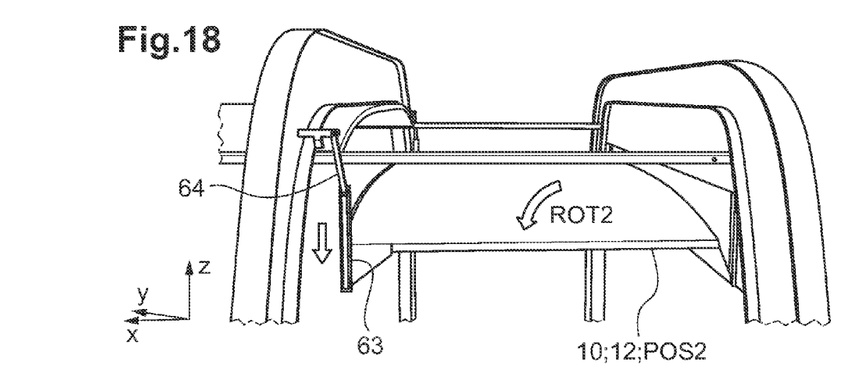

With reference to FIG. 18, the operator thus inhibits the locking member 71.

Consequently, each rod 64 returns substantially to its initial position visible in FIG. 16. In addition, each movable slideway slides around the associated rod 64. This movement is then stopped by the high abutment of the movable slideway blocking against the bottom end of the rod 64.

Moreover, each pivot member 49 allows the retractable panel to pivot with a second movement in rotation ROT2.

The retractable panel 12 is then in the open position POS2.

Figure 19:
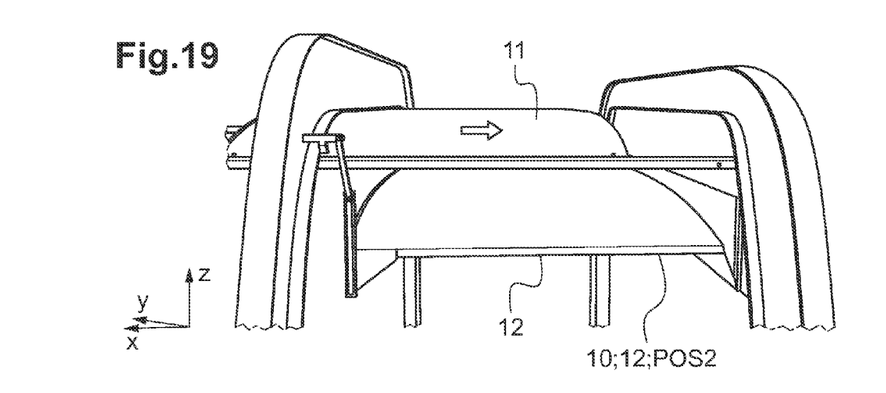

With reference to FIG. 19, retraction of the retractable panel 12 thus releases space in the sliding plane. Consequently, the sliding panels 11 can be moved longitudinally.

In this context, the first and the second embodiments make it possible to move the retractable panel by means of at least one movement in rotation. In the first embodiment, the movement device positions the retractable panel substantially vertically by means of a movement in rotation. In the second embodiment, the movement device positions the retractable panel substantially horizontally by means of two successive movements in rotations.

Figure 22:
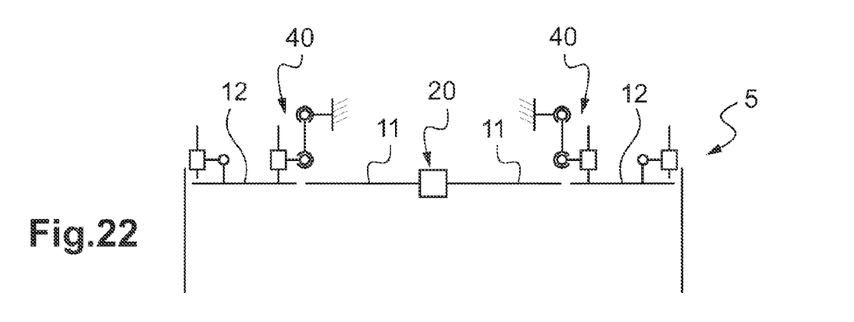
FIG. 22 is a view of an aircraft provided with two retractable panels.

FIG. 22 presents a ceiling 5 provided with a plurality of retractable panels 12.

For example, the sliding panels 11 are indeed positioned between two retractable panels. Although FIG. 22 presents retractable panels that are each provided with a movement device 40 of the embodiment shown in FIG. 17, it is possible to envisage using the other embodiments described.

In addition, the presser means 20 may for example include at least one resilient member arranged between two sliding panels that are touching each other.

Naturally, the present invention may be subjected to numerous variants as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A ceiling on a vehicle, comprising:
   a plurality of rigid panels, each panel extending longitudinally from a front longitudinal edge towards a rear longitudinal edge and laterally from a left edge towards a right edge;
   presser means tending to press each panel of the plurality of rigid panels longitudinally against at least one adjacent panel;
   wherein at least one panel of the plurality of rigid panels is a sliding panel carried by a guide device, the left edge and the right edge of the sliding panel being permanently located in a sliding plane, the sliding panel being capable of sliding longitudinally along the guide device;
   wherein at least one panel of the plurality of rigid panels is a retractable panel that is movable in elevation in order to be moved in reversible manner from an open position towards a closed position, the left edge and the right edge of the retractable panel being located in the sliding plane in the closed position and under the sliding plane in the open position, one of the longitudinal edges of the retractable panel touching one of the longitudinal edges of the sliding panel in the closed position, the sliding panel being free to move in longitudinal translation along the guide device when the retractable panel is in the open position and being prevented from moving when the retractable panel is in the closed position; and
   wherein the ceiling further comprises movement means for moving the retractable panel in a reversible manner from the closed position to the open position.

2. A ceiling according to claim 1, wherein at least one panel of the plurality of rigid panels includes at least one male peg provided on one of the longitudinal edges, the male peg tending to penetrate into a female opening of one of the longitudinal edges of another panel of the plurality of rigid panels as a result of pressure exerted by the presser means.

3. A ceiling according to claim 1, wherein the presser means are placed against one of the longitudinal edges of the sliding panel, the sliding panel touching a single other panel of the plurality of rigid panels via the other longitudinal edge of the sliding panel, the presser means having fastener means suitable for fastening to a frame on a vehicle.

4. A ceiling according to claim 1, wherein each panel of the plurality of rigid panels is in the shape of an arch.

5. A ceiling according to claim 1, wherein the guide device comprises two longitudinal guide rails arranged in the sliding plane, each guide rail having at least one fastener device for fastening to at least two frames on a vehicle.

6. A ceiling according to claim 1, wherein the sliding panel is secured to a support carrying at least one electrical connector engaged in another electrical connector and/or including a hollow duct in alignment with another hollow duct.

7. A ceiling according to claim 1, wherein for the retractable panel, the movement means comprises at least one hinge fastened to a longitudinal edge of the retractable panel in order to enable the retractable panel to move in rotation from the open position towards the closed position, and a locking device in order to lock the retractable panel in the closed position.

8. A ceiling according to claim 7, wherein each hinge has an axis of rotation about which the retractable panel can turn, the axis of rotation being substantially parallel to the sliding plane and being located under the sliding plane.

9. A ceiling according to claim 1, wherein, for the retractable panel, the movement means comprises a system for shifting the retractable panel vertically, the retractable panel in the open position being parallel to an image of the retractable panel arranged in the closed position.

10. A ceiling according to claim 9, wherein one of the longitudinal edges of the retractable panel is a touching edge that touches the sliding panel in the closed position and the other longitudinal edge of the retractable panel is a non-touching edge that never touches the sliding panel, and wherein the movement means comprises a stationary slideway extending at least under the retractable panel in the closed position, with a pivot member secured to the non-touching edge sliding along the stationary slideway.

11. A ceiling according to claim 10, wherein the movement means comprises two stationary slideways along which two pivot members slide.

12. A ceiling according to claim 10, wherein each pivot member is arranged under the retractable panel while being secured to a projection in elevation of the non-touching edge.

13. A ceiling according to claim 10, wherein the movement means includes a locking member for locking the pivot member relative to the corresponding stationary slideway in the closed position.

14. A ceiling according to claim 10, wherein the stationary slideway extends from an upper section towards a lower section, and the lower section includes a low abutment.

15. A ceiling according to claim 10, wherein the pivot member is fastened in removable manner to the retractable panel.

16. A ceiling according to claim 9, wherein one of the longitudinal edges of the retractable panel is a touching edge for touching the sliding panel in the closed position and the other of the longitudinal edges of the retractable panel is a non-touching edge that does not touch the sliding panel, and wherein the movement means comprises a movable slideway secured to the touching edge and a rod, the rod including a bottom end provided with pivot means sliding along the movable slideway and a top end provided with a hinged assembly configured to be fastened to a frame on a vehicle.

17. A ceiling according to claim 16, wherein the movement means comprises a locking system for locking the movable slideway relative to the pivot means in the closed position.

18. A ceiling according to claim 16, wherein the pivot means is fastened in removable manner to the corresponding rod.

19. A ceiling according to claim 16, wherein the movable slideway extends from an upper segment towards a lower segment, and the upper segment comprises a high abutment.

20. A vehicle comprising a cabin, wherein the cabin is provided with a ceiling according to claim 1.

21. A method of accessing elements located behind a ceiling according to claim 1, the method comprising sequentially:

moving the retractable panel in elevation from the closed position to the open position;

moving the sliding panel longitudinally in order to access the elements;

positioning the sliding panel back in place; and moving the retractable panel from the open position to the closed position in order to close the ceiling, and compressing the presser means.

* * * * *